(12) United States Patent
Ballard et al.

(10) Patent No.: US 10,418,795 B2
(45) Date of Patent: Sep. 17, 2019

(54) TOOL HAVING AN INCLINED HANDLE

(71) Applicant: Milwaukee Electric Tool Corporation, Brookfield, WI (US)

(72) Inventors: Jim Ballard, Brookfield, WI (US); Marc D'Antuono, Brookfield, WI (US); Ian Zimmermann, Brookfield, WI (US); Luke Skinner, Brookfield, WI (US); Eric Norquist, Brookfield, WI (US); Joe Ellice, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 123 days.

(21) Appl. No.: 15/616,572

(22) Filed: Jun. 7, 2017

(65) Prior Publication Data
US 2017/0358909 A1 Dec. 14, 2017

Related U.S. Application Data

(60) Provisional application No. 62/347,586, filed on Jun. 8, 2016.

(51) Int. Cl.
| | |
|---|---|
| *H02G 1/00* | (2006.01) |
| *B25F 5/02* | (2006.01) |
| *G05B 15/02* | (2006.01) |
| *H01H 13/14* | (2006.01) |
| *B25F 5/00* | (2006.01) |
| *B25B 27/10* | (2006.01) |

(52) U.S. Cl.
CPC ............ *H02G 1/005* (2013.01); *B25B 27/10* (2013.01); *B25F 5/005* (2013.01); *B25F 5/02* (2013.01); *G05B 15/02* (2013.01); *H01H 13/14* (2013.01)

(58) Field of Classification Search
CPC ....... B60R 25/04; B60R 25/24; B60R 25/241; B60R 2325/105; B60R 2325/205; B60R 25/042; B60R 25/102; B60R 25/406; B60R 2325/306; B60R 25/00; B60R 25/045; B60R 25/20
USPC ...................................................... 340/5.31
See application file for complete search history.

(56) References Cited

U.S. PATENT DOCUMENTS

| | | |
|---|---|---|
| D356,478 S | 3/1995 | Heskey et al. |
| D383,046 S | 9/1997 | Moffatt et al. |
| D387,961 S | 12/1997 | Yasui et al. |

(Continued)

FOREIGN PATENT DOCUMENTS

CA 2774505 A1 10/2013

OTHER PUBLICATIONS

Form PCT/ISA/220, Notification of Transmittal of The International Search Report and Written Opinion of the International Searching Authority, or the Declaration.

*Primary Examiner* — Mark S Blouin
(74) *Attorney, Agent, or Firm* — McDonnell Boehnen Hulbert & Berghoff LLP

(57) ABSTRACT

An example tool includes a housing; an inclined handle coupled to, and extending obliquely from, a top portion of the housing, where the inclined handle has a first trigger button and a second trigger button; and an interlocking mechanism disposed in the inclined handle. The interlocking mechanism is configured to disable one of the first trigger button or the second trigger button while the other of the first trigger button or the second trigger button is triggered.

16 Claims, 15 Drawing Sheets

(56) References Cited

U.S. PATENT DOCUMENTS

| | | | |
|---|---|---|---|
| 5,727,417 A | 3/1998 | Moffatt et al. | |
| D404,627 S | 1/1999 | Hirabayashi | |
| D408,242 S | 4/1999 | Yamamoto | |
| 7,464,578 B2 * | 12/2008 | Ayer | B25B 27/10 60/477 |
| D591,128 S | 4/2009 | Chuan | |
| 7,640,780 B2 | 1/2010 | Ruland | |
| 7,788,962 B2 * | 9/2010 | Chiasson | B25B 27/10 29/751 |
| 7,841,223 B2 | 11/2010 | Rollins et al. | |
| 7,926,321 B2 | 4/2011 | Rollins et al. | |
| D676,298 S | 2/2013 | Tully et al. | |
| D709,748 S | 7/2014 | Frenken | |
| D710,173 S | 8/2014 | Frenken | |
| D730,140 S | 5/2015 | Barezzani et al. | |
| 2006/0272381 A1 | 12/2006 | Ayer et al. | |
| 2008/0282507 A1 | 11/2008 | Chiasson et al. | |
| 2008/0282763 A1 | 11/2008 | Chiasson et al. | |
| 2014/0165410 A1 * | 6/2014 | Johnson | B23D 27/04 30/228 |
| 2016/0363510 A1 * | 12/2016 | Kanack | B25B 27/10 |

* cited by examiner

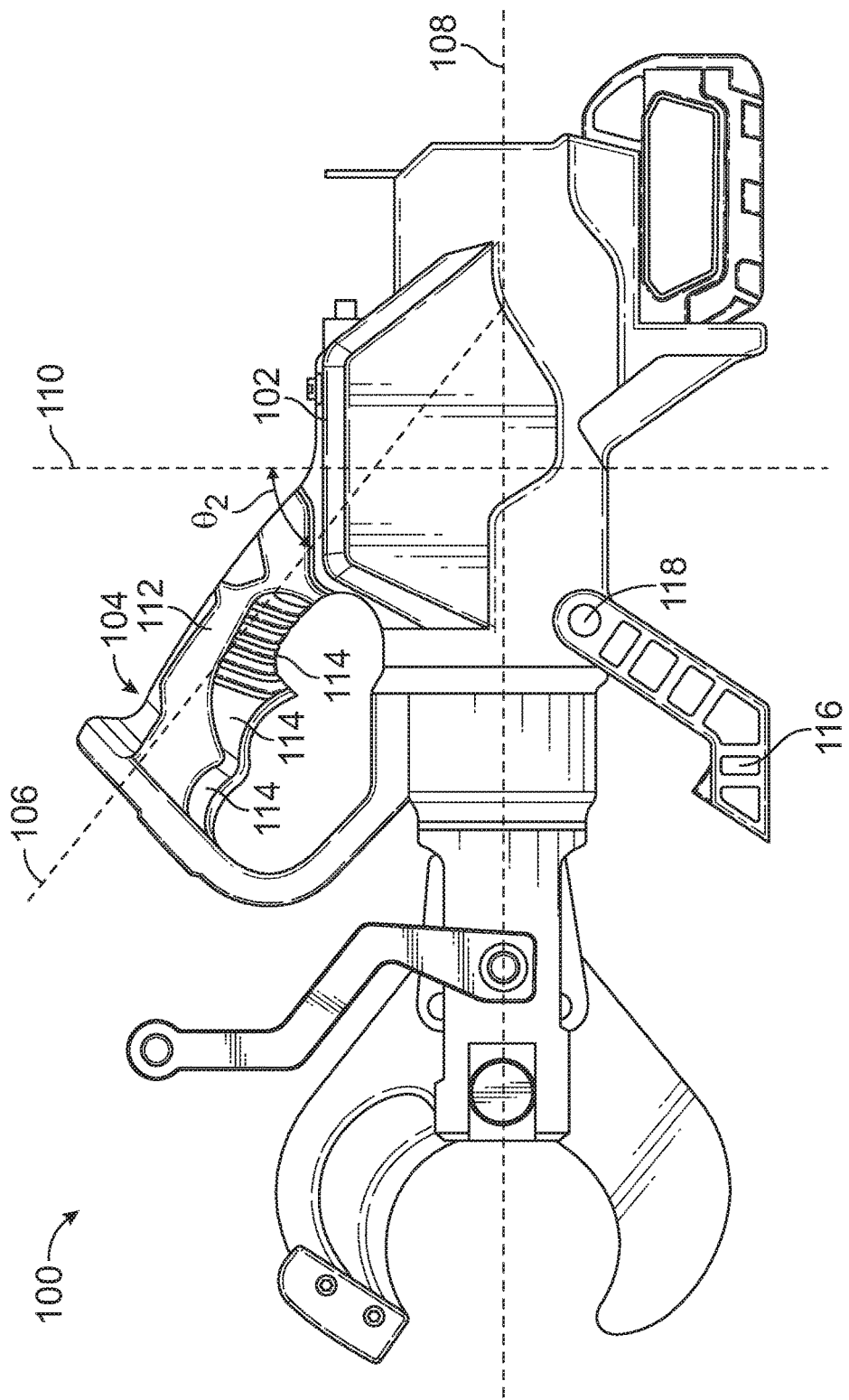

TOOL HAVING AN INCLINED HANDLE

FIELD

The present disclosure relates generally to construction and operation of tools.

BACKGROUND

A powered tool may include one or more movable blades that are actuatable by a hydraulic or electromechanical actuation system. By providing power to the actuation system, the blades move relative to each other to perform operations such as cutting, crimping, separation, blanking, etc.

SUMMARY

The present disclosure describes embodiments that relate to systems, apparatuses, tools, and methods associated with a tool having an inclined handle.

In an example implementation, the present disclosure describes a tool. The tool includes: (i) a housing; (ii) an inclined handle coupled to, and extending obliquely from, a top portion of the housing, where the inclined handle has a first trigger button and a second trigger button; and (iii) an interlocking mechanism disposed in the inclined handle. The interlocking mechanism is configured to disable one of the first trigger button or the second trigger button while the other of the first trigger button or the second trigger button is triggered.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 1 illustrates a tool, in accordance with an example implementation.

DETAILED DESCRIPTION

Figure 2A:
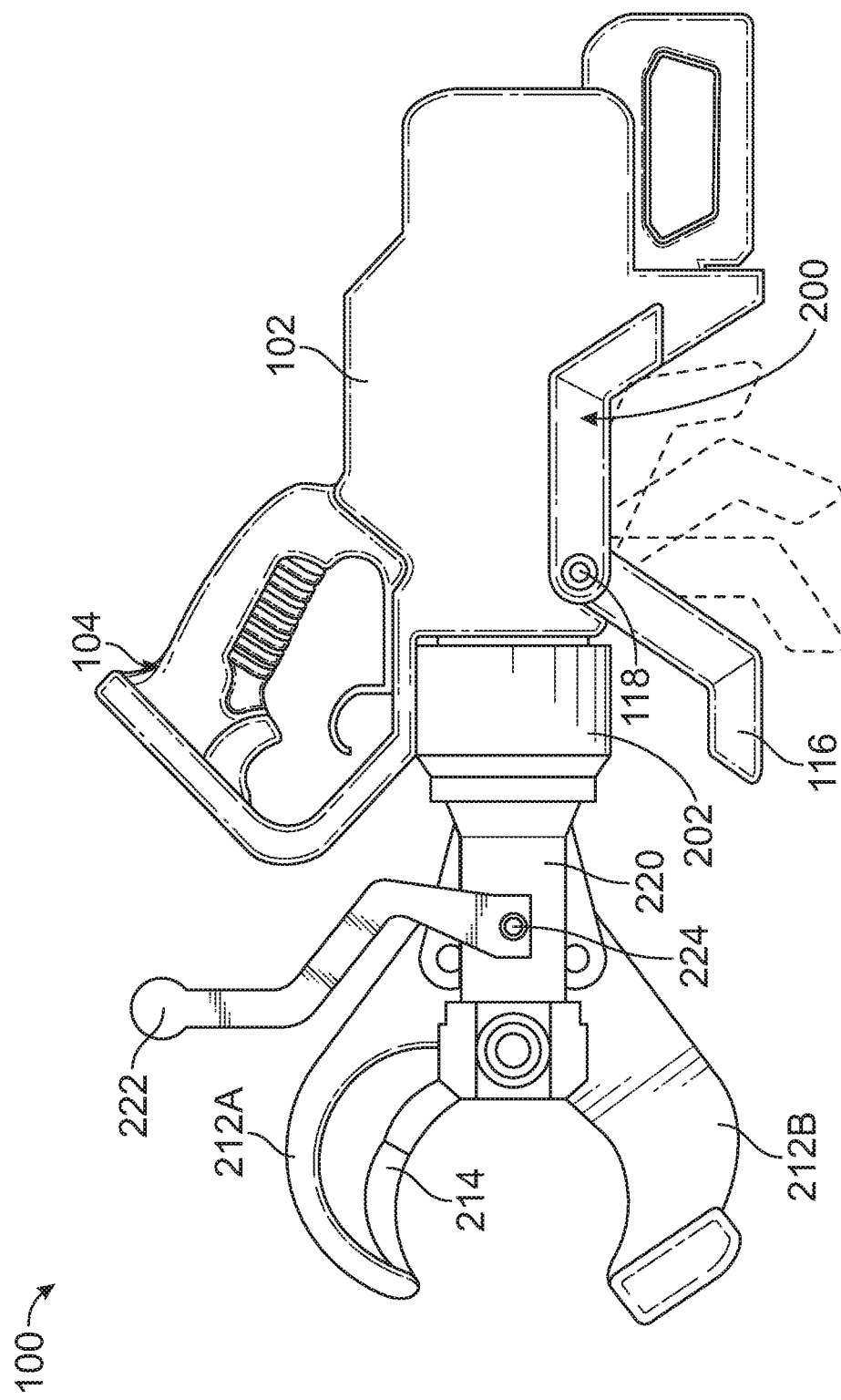
FIG. 2A illustrates rotation of a stand coupled to the tool of FIG. 1, in accordance with an example implementation.

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

I. Overview

A powered tool is a tool that is actuated by an additional power source and mechanism other than the solely manual labor used with hand tools. Example powered tools employ electric motors, hydraulic systems, etc. to power the tool.

These tools could be heavy and handling them by an operator could be challenging. Further, in examples, electrical equipment may be maintained while operating at high voltages. An example maintenance operation may involve cutting a live line. In this example, it is desirable to perform a cable cutting operation by way of a remotely controlled cutting tool so as to insulate workers from any electrical hazards. In other examples, the line might not be easily reachable. For instance, the cable may be in an underwater environment, and may thus be cut via remote control of the cutting tool.

Disclosed herein are systems, tools, and apparatuses that provide for ergonomic handling of powered tools as wells remote control of a cutting tool to insulate workers from hazardous environments.

II. Example Tool

FIG. 1 illustrates a tool 100, in accordance with an example implementation. Although the example implementation described herein references an example cutting tool, it should be understood that the features of this disclosure can be implemented in any other tool (crimping, separation, blanking, etc.). In addition, any suitable size, shape or type of elements or materials could be used.

The tool 100 includes a housing 102 and an inclined handle 104 coupled to a top portion of the housing 102. As shown in FIG. 1, the inclined handle 104 extends obliquely from the top portion of the housing.

Particularly, as shown in FIG. 1, the inclined handle 104 defines a handle axis 106 that intersects with a horizontal axis 108 of the housing 102 or the tool 100, and also intersects with a vertical axis 110 of the housing 102 or the tool 100 at respective inclined angles $\theta_1$ and $\theta_2$. This inclined handle 104 protruding from the top portion of the housing 102 facilitates handling the tool 100 by an operator. The operator can hold this tool 100 and move it around by one hand via the inclined handle 104.

Further, the angles $\theta_1$ and $\theta_2$ are obtuse and substantially correspond to the angle formed by the hand with the forearm in the so-called "neutral posture." This configuration provides for a convenient, comfortable, safe and efficient grip of the tool 100 during work execution. In particular, the structural conformation of a grip of the inclined handle 104 allows a force exerted by the operator to carry and handle the tool 100 to be distributed between various muscles, thus allowing for reduced stress compared to straight handles.

Further, the inclined handle 104 extends upward from the top portion of the housing 102 as opposed to a more conventional gun-type handle that protrudes downward. As such, the operator exerts a pulling force to hold the tool 100 as opposed to a pushing force if a conventional handle is used. This configuration may reduce wobble of the tool 100 when it is powered.

Further, the inclined handle 104 has a handle housing 112 that provides a user with a comfortable ergonomic handle for operating the tool 100. Particularly, at least a portion of an exterior profile of the handle housing 112 has depressions 114. FIG. 1 illustrates three depressions 114; however, more or fewer depressions could be disposed on the handle housing 112.

The depressions 114 are spatially arranged in series along the portion of the exterior profile of the handle housing 112. The depressions 114 may be configured to receive fingers of a user operating the tool 100, and may also include triggers or buttons for operating the tool 100 as described below with respect to FIG. 2B.

The tool 100 further includes a stand 116 rotatably coupled to a bottom of the housing 102. Particularly, the stand 116 is pivotally mounted at a pivot 118 to the housing 102 such that the stand 116 is rotatable about the housing 102. The stand 116 can be placed in a first position shown in FIG. 1 that enables the tool 100 to be positioned on a work surface while maintaining a desired orientation.

FIG. 2A illustrates rotation of the stand 116, in accordance with an example implementation. As shown in FIG. 2A, the stand 116 may be rotated to several positions, and may be folded underneath the housing 102 when place in position 200. However, the stand 116 could be placed in several other positions shown in dashed lines in FIG. 2A.

Figure 2B:
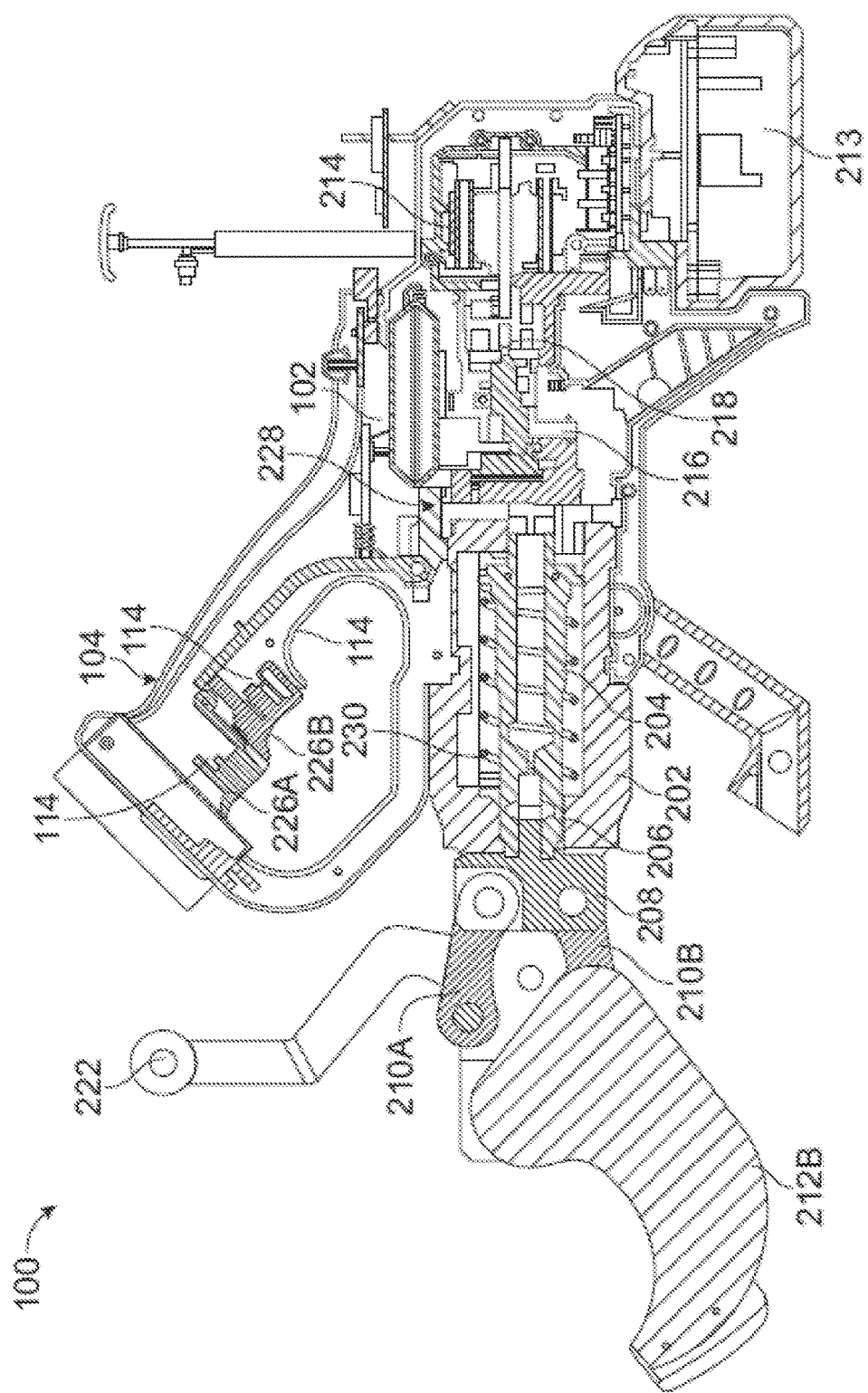
FIG. 2B illustrates a cross section of the tool, in accordance with an example implementation.

FIG. 2B illustrates a cross section of the tool 100, in accordance with an example implementation. The tool 100 further includes a hydraulic actuator cylinder 202 coupled to the housing 102. A piston 204 is slidably accommodated within the hydraulic actuator cylinder 202, and the piston 204 is coupled to a ram 206. The ram 206 is coupled to a carrier 208, which is coupled to links 210A and 210B. The links 210A and 210B are further coupled to one or more jaws, such as jaws 212A and 212B (FIG. 2A shows both jaws 212A and 212B, whereas FIG. 2B shows the jaw 212B).

The tool 100 may include a battery 213 configured to provide electric power to an electric motor 214. The electric motor 214 is configured to drive a pump 216 via a gear reducer 218, and the pump 216 is configured to provide pressurized fluid to the hydraulic actuator cylinder 202 to linearly extend the piston 204 (and the ram 206) therein. As the piston 204 extends within the hydraulic actuator cylinder 202, the piston 204 drives the links 210A and 210B, which in turn drive the jaws 212A and 212B toward each other. At least one of the jaws, e.g., the jaw 212A, may have a blade 214 (shown in FIG. 2A) configured to cut a cable placed between the jaws 212A and 212B. As the piston 204 retracts, the jaws 212A and 212B move away from each other.

As shown in FIG. 2A, the tool 100 further includes a clevis 220. The clevis 220 has a first end coupled to the hydraulic actuator cylinder 202 and a second end coupled to the one or more jaws 212A and 212B. The tool 100 further includes a basket-style handle 222 coupled to the clevis 220 and extending upward as shown in FIGS. 2A and 2B.

An operator may hold the tool 100 by having one hand gripping the inclined handle 104 and the other hand gripping the basket-style handle 222. This two-handed operation of the tool 100 enables one operator to handle the tool 100 without assistance. Also, the basket-style handle 222 may facilitate changing orientation of the tool 100. Further, the basket-style handle 222 may be pivotably mounted at pivot 224 to the clevis 220 such that an angle between the basket-style handle 222 and the clevis 220 could be adjustable.

III. Interlocking Mechanism

As shown in FIG. 2B, the tool 100 includes a first button 226A and a second button 226B disposed in the depressions 114 of the inclined handle 104. The button 226A may for example be configured to trigger the tool 100 to extend the piston 204 when pulled, and the other button 226B may be configured to trigger retraction of the piston 204 when pressed as described below.

The tool 100 may include a controller coupled to or embedded within the housing 102 or anywhere else within the tool 100. The controller may be configured to operate the tool 100. For example, the controller may be in communication with sensors coupled to the tool 100. The controller may also be in communication with the buttons 226A and 226B and components of the actuation mechanism of the tool 100.

For instance, if the button 226A is pulled, the controller may, in response cause power from the battery 213 to be provided to the motor 214 to extend the piston 204. If the button 226B is pulled, the controller may actuate a release valve 228 to provide a path of high pressure fluid within the hydraulic actuator cylinder 202 to a reservoir. In an example, a spring 230 disposed within the hydraulic actuator cylinder 202 may be configured to push the piston 204 in a retraction direction, thus causing the hydraulic fluid to be discharged from the hydraulic actuator cylinder 202 to the reservoir.

The controller may further operate the actuation mechanism based on sensor inputs. Example sensor inputs include position sensor information indicating position of the piston 204, pressure sensor information indicating hydraulic pressure within the hydraulic actuator cylinder 202, etc.

Figure 3A:
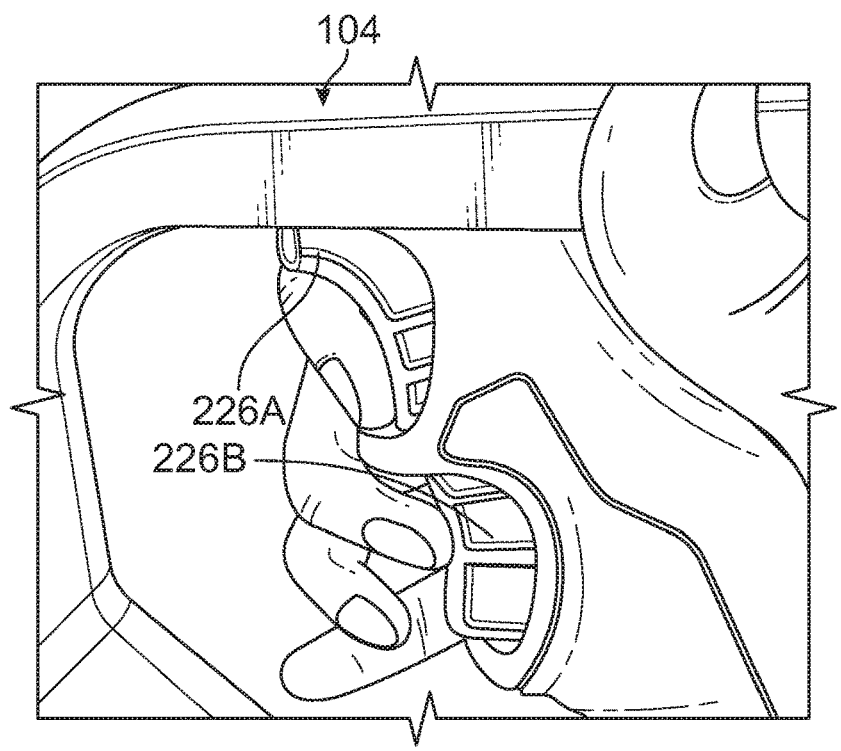
FIGS. 3A-3B illustrate interlocking buttons of the tool shown in FIG. 1, in accordance with an example implementation, in accordance with an example implementation.
Figure 3B:
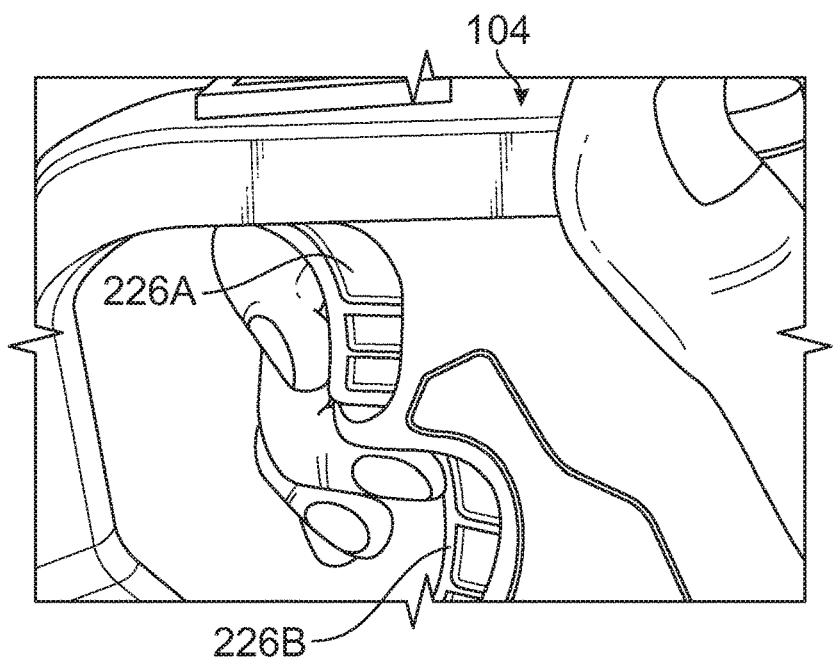

In some examples, it is desirable for safety reasons to interlock operation of the buttons 226A and 226B such that if one of the buttons is pulled, the other could not be pulled and is effectively disabled. FIGS. 3A and 3B illustrate interlocking the buttons 226A and 226B, in accordance with an example implementation. As shown in FIG. 3A, the button 226A is pulled so as to trigger the tool 100 and cause the piston 204 to extend. While the button 226A is pulled, the button 226B cannot be pulled. Similarly, as shown in FIG. 3B, the button 226B is pulled so as to cause the piston 204 to retract. While the button 226B is pulled, the button 226A cannot be pulled. FIGS. 4A, 4B, 4C, 4D, 4E, and 4F illustrate components and operation of an interlocking mechanism, in accordance with an example implementation.

Figure 4A:
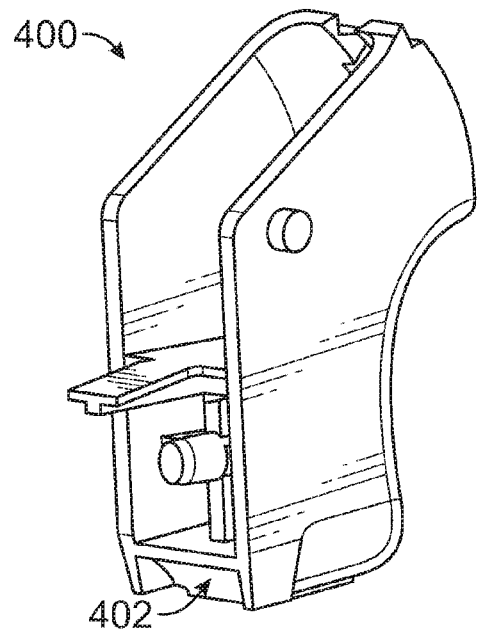
FIG. 4A illustrates a rear perspective view of a trigger cap of a first button of the tool, in accordance with an example implementation.
Figure 4B:
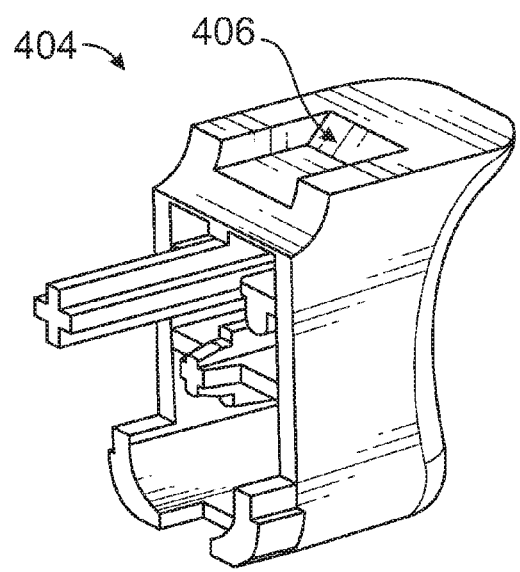
FIG. 4B illustrates a rear perspective view of a trigger cap of a second button of the tool, in accordance with an example implementation.

FIG. 4A illustrates a rear perspective view of a trigger cap 400 of the button 226A, in accordance with an example implementation. The trigger cap 400 has an interlock stop 402, e.g., a groove, the operation of which is described below. FIG. 4B illustrates a rear perspective view of a trigger cap 404 of the button 226B, in accordance with an example implementation. The trigger cap 404 has an interlock stop 406, e.g., a groove, the operation of which is described below. The trigger cap 400 represents the button 226A, and therefore the trigger cap 400 and the button 226A are used interchangeably herein. Similarly, the trigger cap 404 represents the button 226B, and therefore the trigger cap 404 and the button 226B are used interchangeably herein.

Figure 4C:
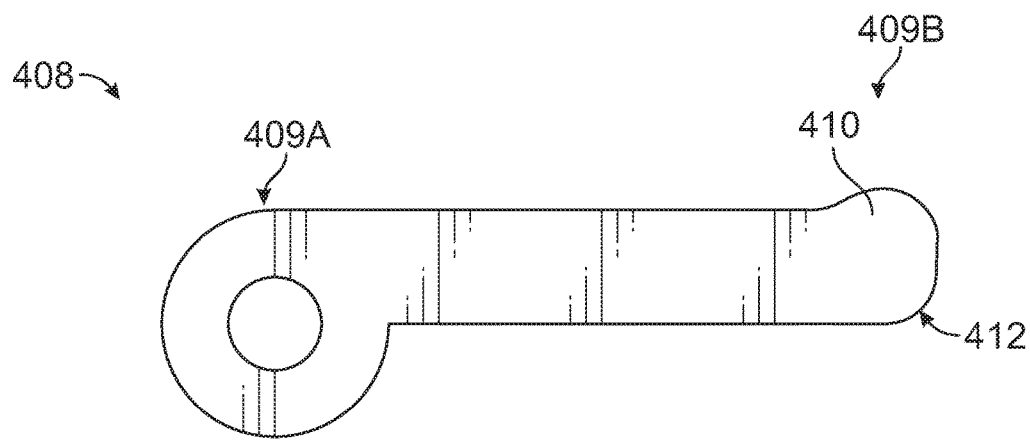
FIG. 4C illustrates a side view of an interlock toggle lever, in accordance with an example embodiment.
Figure 4D:
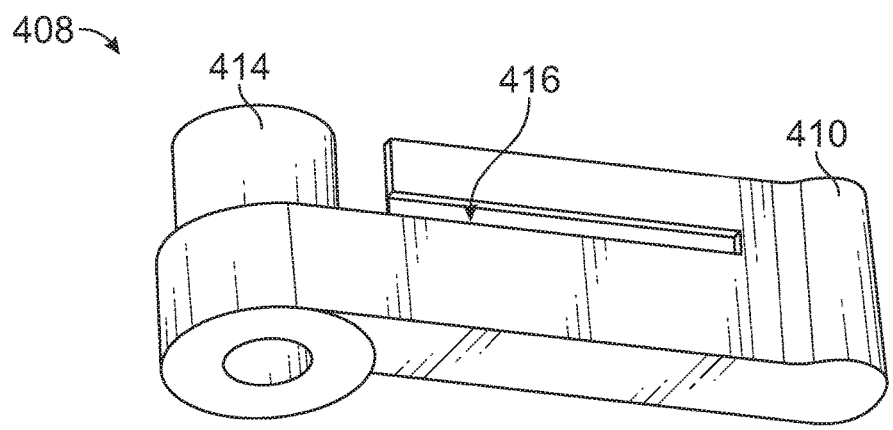
FIG. 4D illustrates a perspective view of the interlock toggle lever of FIG. 4C, in accordance with an example embodiment.
Figure 4E:
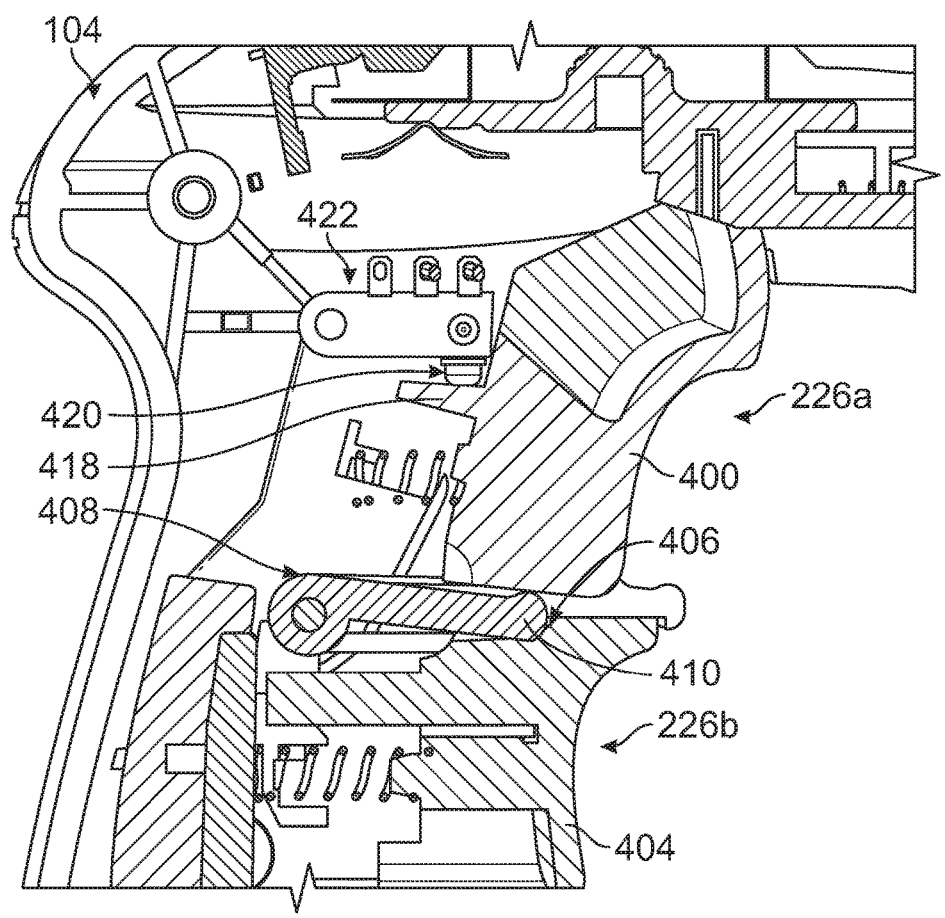
FIG. 4E shows an internal view of an inclined handle to illustrate operation of an interlocking mechanism when a first button is pulled, in accordance with an example implementation.

FIG. 4C illustrates a side view of an interlock toggle lever 408, and FIG. 4D illustrates a perspective view of the interlock toggle lever 408, in accordance with an example embodiment. The toggle lever has a proximal end 409A that is pivotally mounted inside the inclined handle 104 as shown in FIG. 4E, and a distal end 409B. The distal end 409B is disposed between the trigger cap 400 of the button 226A and the trigger cap 404 of the button 226B.

The distal end 409B has a protrusion 410 that operates as a power trigger interlock feature. The interlock toggle lever 408 also includes a return trigger interlock feature 412. The interlock toggle lever 408 also includes a bias spring guide 414 and a bias spring slot 416. A torsional spring could be wrapped about the bias spring guide 414 and could have a leg disposed in the bias spring slot 416.

FIG. 4E shows an internal view of the inclined handle 104 to illustrate operation of the interlocking mechanism when the button 226A is pulled, in accordance with an example implementation. As shown, the trigger cap 400 has a protruding member 418 that, when the button 226A is pulled, touches a contact 420 of a switch 422, thus closing an electric circuit. Closing this electric circuit provides a signal to the controller of the tool 100 indicating that the power trigger (i.e., the button 226A) has been triggered. In response, the controller activates the motor 214 to extend the piston 204 and perform a cutting operation.

As illustrated in FIG. 4E, when the trigger cap 400 moves backward as a result of pulling the button 226A, the trigger cap 400 pushes the protrusion 410 of the toggle lever 408, thus pushing the return trigger interlock feature 412 into the interlock stop 406 of the trigger cap 404. As a result, if the operator attempts to pull the trigger cap 404 backward to trigger the button 226B, the trigger cap 404 is prevented from moving and the button 226B would not be actuated.

Further, the trigger cap 400 pushes the toggle lever 408 downward against a force of the torsional spring mounted about the bias spring guide 414. When the trigger cap 400 is released, the torsional spring causes the toggle lever 408 to return back to a neutral position.

Figure 4F:
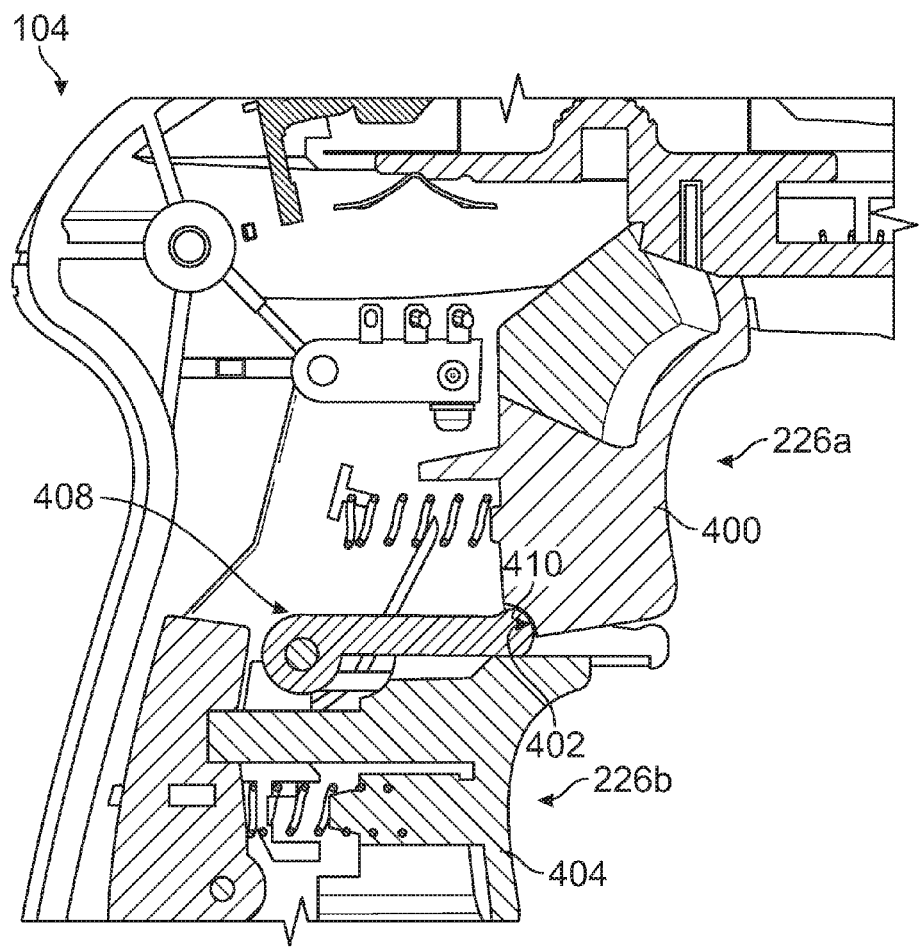
FIG. 4F shows an internal view of the inclined handle to illustrate operation of the interlocking mechanism when a second button is pulled, in accordance with an example implementation.

Similarly, FIG. 4F shows an internal view of the inclined handle 104 to illustrate operation of the interlocking mechanism when the button 226B is pulled, in accordance with an example implementation. When the trigger cap 404 moves backward as a result of pulling the button 226B, the trigger cap 404 pushes the toggle lever 408 upward, thus pushing the protrusion 410 into the interlock stop 402 of the trigger cap 400. As a result, if the operator attempts to pull the trigger cap 400 backward to trigger the button 226A, the trigger cap 400 would not move and the button 226A would not be actuated.

The trigger cap 404 pushes the toggle lever 408 upward against a force of the torsional spring mounted about the bias spring guide 414. When the trigger cap 404 is released, the torsional spring causes the toggle lever 408 to return back to a neutral position.

In this manner, because of the interlocking mechanism described by FIGS. 4A-4F, if either of the buttons 226A or 226B is triggered, the other button is precluded from being actuated until the triggered button is released. This interlocking mechanism thus prevents any mistaken triggering of either button while the other is actuated, and renders the tool 100 safer.

IV. Slide Mechanism

In addition to the interlocking mechanism described above, the tool 100 may have a slide mechanism that controls operation of the buttons 226A and 226B.

Figure 5A:
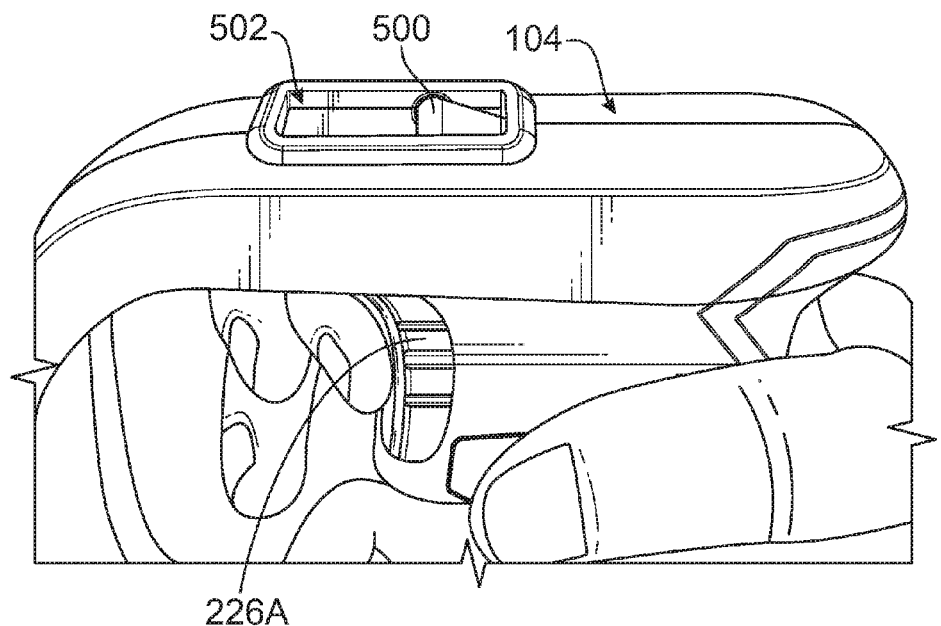
FIG. 5A illustrates a perspective view of an inclined handle having a toggle switch in a first position, in accordance with an example implementation.

For example, FIG. 5A illustrates a perspective view of the inclined handle 104 having a toggle switch 500 in a first position, in accordance with an example implementation. As shown, the inclined handle 104 has a cutout section 502 section on a top surface of the inclined handle 104. The toggle switch 500 protrudes through the cutout section 502 and is configured to slide within the cutout section 502 between three positions. For example, the first position of the toggle switch 500 is illustrated in FIG. 5A. When the toggle switch 500 is placed in that first position, the button 226A is locked in an "off" state, and cannot be triggered.

Figure 5B:
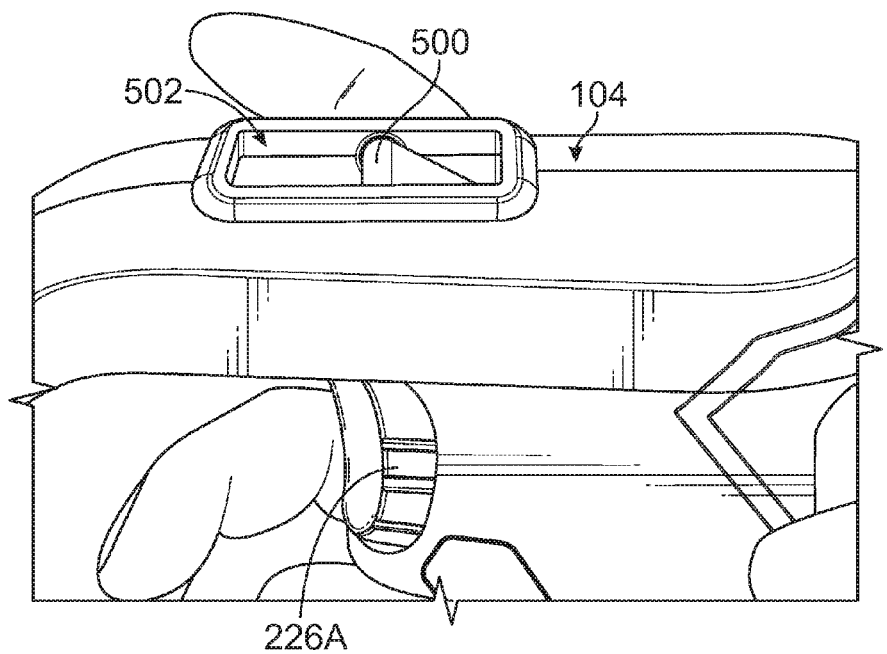
FIG. 5B illustrates a perspective view of the inclined handle having the toggle switch in a second position, in accordance with an example implementation.

FIG. 5B illustrates a perspective view of the inclined handle 104 having the toggle switch 500 in a second position, in accordance with an example implementation. When the toggle switch 500 is placed in that second position, the button 226A is in a neutral or floating state and can be freely triggered or released.

Figure 5C:
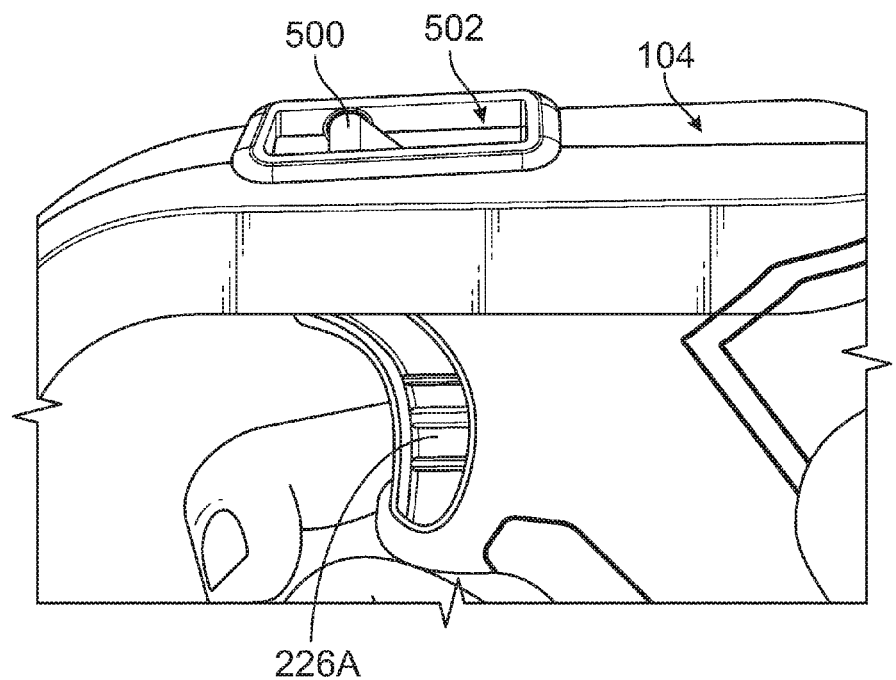
FIG. 5C illustrates a perspective view of the inclined handle having the toggle switch in a second position, in accordance with an example implementation.

FIG. 5C illustrates a perspective view of the inclined handle 104 having the toggle switch 500 in a third position, in accordance with an example implementation. When the toggle switch 500 is placed in this third position, the button 226A is in locked in an "on" or triggered state. This position facilitates remote operation of the tool 100 as described below with respect to FIG. 7.

Figure 6A:
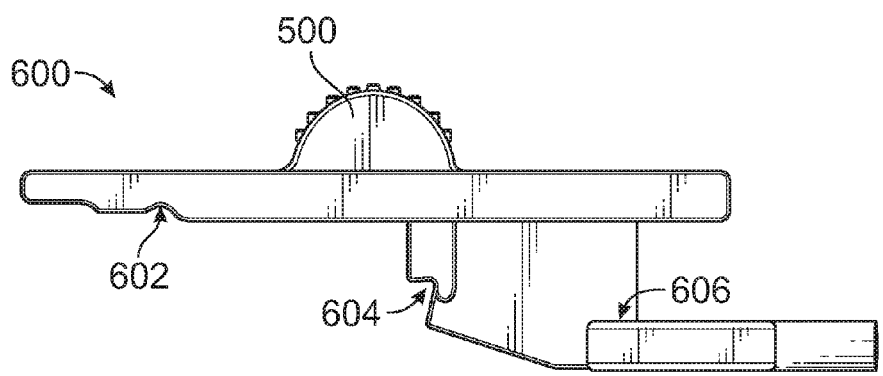
FIG. 6A illustrates a side view of a slide, in accordance with an example implementation.

FIGS. 6A, 6B, 6C, 6D, 6E, 6F, 6Q and 6H illustrate a slide mechanism that implements operation of the toggle switch 500 and its interaction with the buttons 226A, in accordance with an example implementation. Particularly, FIG. 6A illustrates a side view of a slide 600, in accordance with an example implementation. As shown, the slide 600 includes the toggle switch 500. The slide 600 also includes a detent feature 602, a lock-on feature 604, and a lock-off feature 606. The features 602, 604, and 606 interact with corresponding features of the trigger cap 400 of the button 226A to implement the operations associated with the three positions described with respect to FIGS. 5A-5C.

Figure 6B:
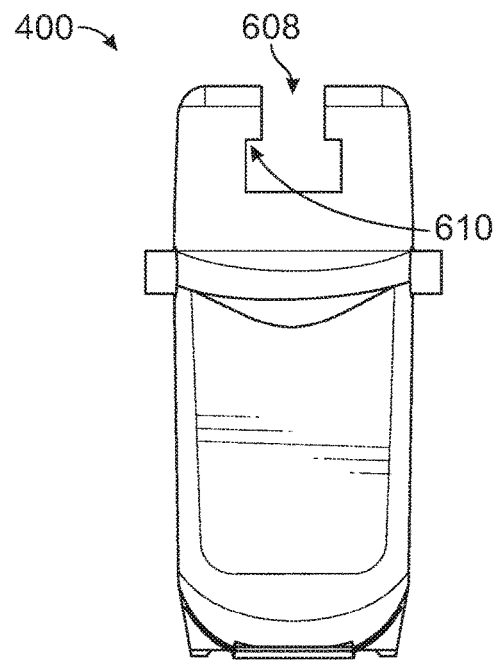
FIG. 6B illustrates a frontal view of a trigger cap to show features corresponding to the features of the slide, in accordance with an example implementation.
Figure 6C:
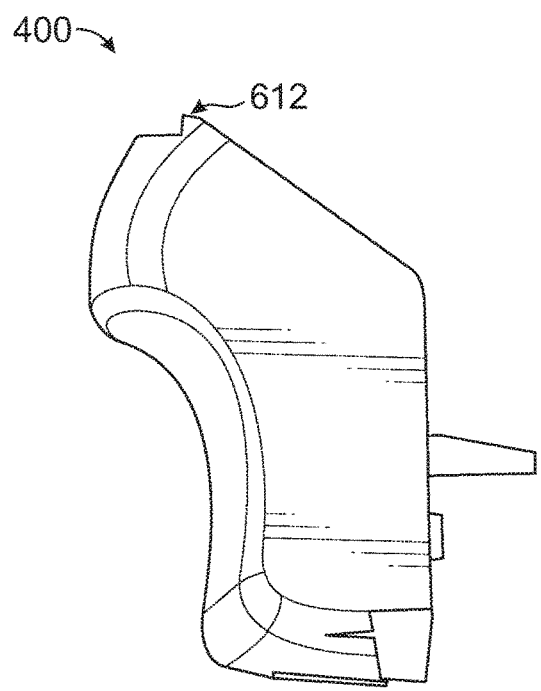
FIG. 6C illustrates a side view of the trigger cap to show features corresponding to the features of the slide, in accordance with an example implementation.

FIG. 6B illustrates a frontal view of the trigger cap 400, and FIG. 6C illustrates a side view of the trigger cap 400 to show features corresponding to the features of the slide 600, in accordance with an example implementation. As shown in FIG. 6B, the trigger cap 400 has a stepped groove 608, which includes a lock-off feature 610. The lock-off feature 610 interacts with the lock-off feature 606 of the slide 600 when the slide 600 and the toggle switch 500 are in the first position shown in FIG. 5A to lock the button 226A in an "off" state.

As shown in FIG. 6C, the trigger cap 400 also has a lock-on feature 612. The lock-on feature 612 interacts with the lock-on feature 604 of the slide 600 when the slide 600 and the toggle switch 500 are in the third position shown in FIG. 5C to lock the button 226A in an "on" or triggered state.

To further illustrate the three states described above, FIGS. 6D-6H illustrate interaction between the slide 600 and the trigger cap 400 when the toggle switch 500 is placed in the first position, the second position, and the third position.

Figure 6D:
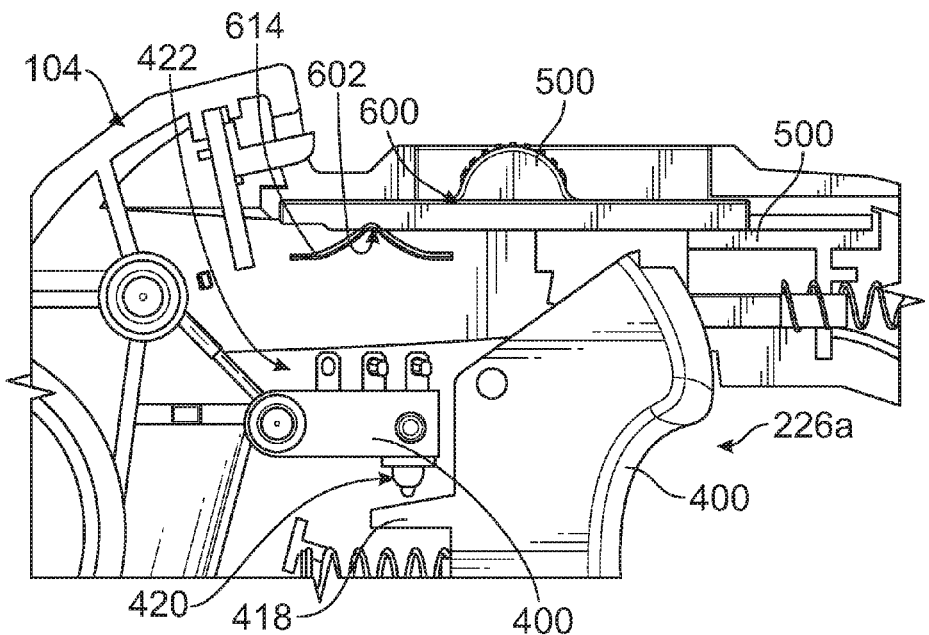
FIG. 6D illustrates a partial side view of an inclined handle while a toggle switch is in a first position, in accordance with an example embodiment.
Figure 6E:
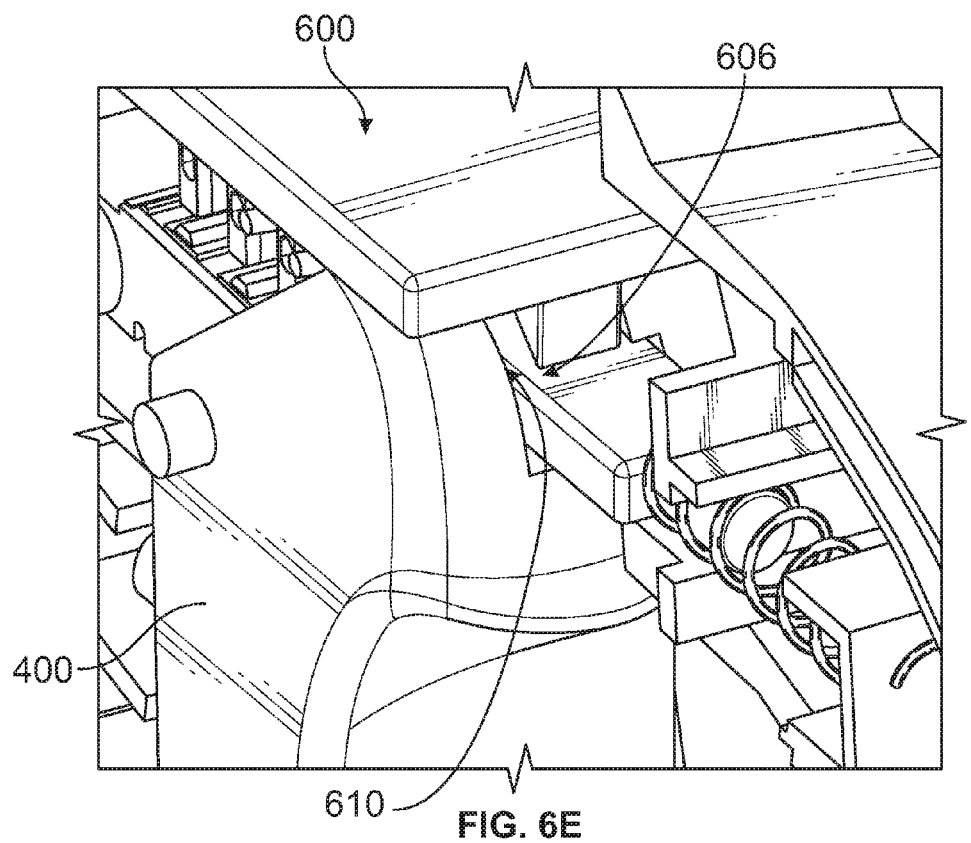
FIG. 6E shows a perspective view of a trigger cap and a toggle switch in a first position, in accordance with an example embodiment.
Figure 6F:
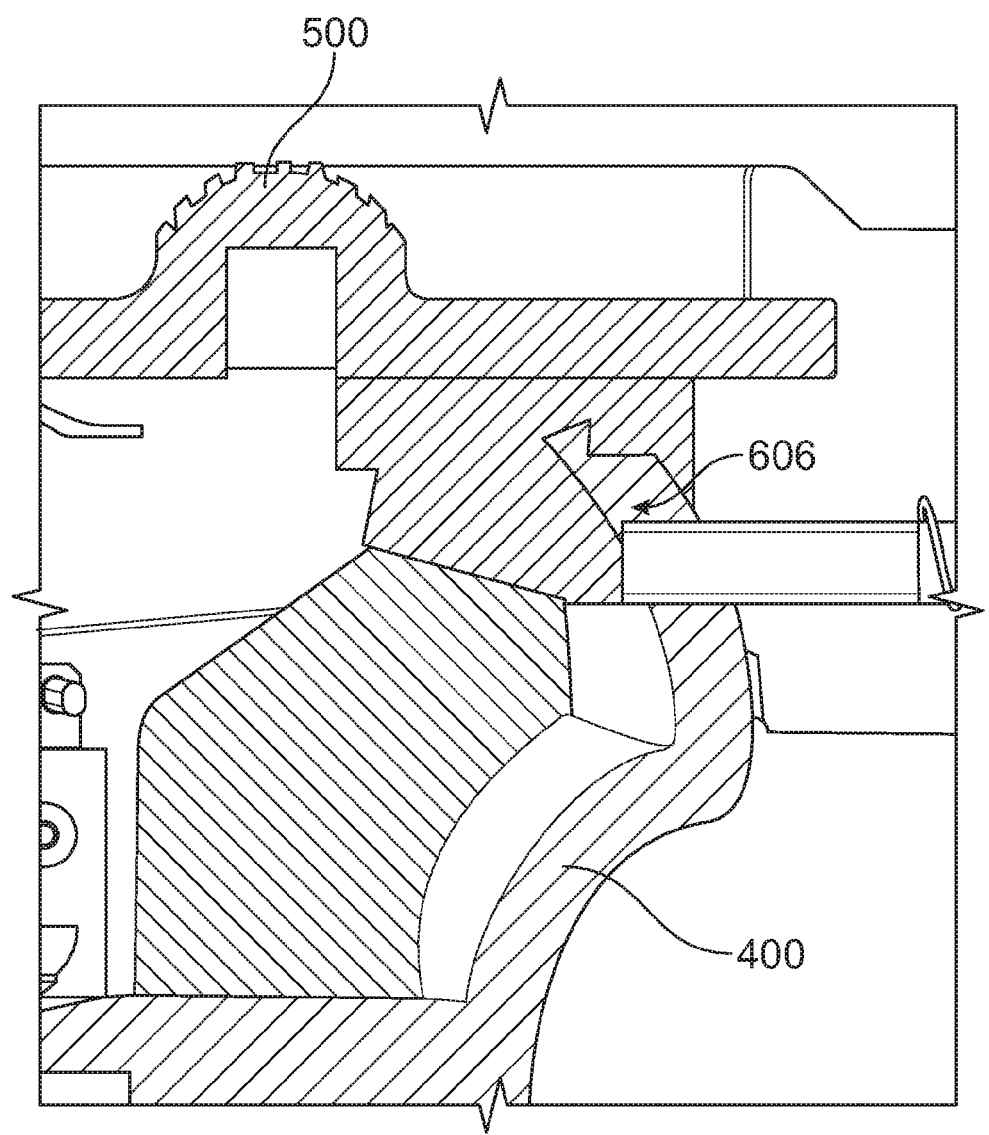
FIG. 6F illustrates a cross section of a trigger cap and a toggle switch in a first position, in accordance with an example embodiment.

FIGS. 6D, 6E, and 6F illustrate the slide 600 and the trigger cap 400 while the toggle switch 500 is in the first position. Particularly, FIG. 6D illustrates a partial side view of the inclined handle 104 while the toggle switch 500 is in the first position.

If the trigger cap 400 of the button 226A is in a released (un-triggered) position and the operator moves the toggle switch 500 to the first position as shown in FIG. 6D, the trigger cap 400 (and the button 226A) would be locked in an "off" state. As shown in FIG. 6D, the inclined handle 104 has a detent member 614 that engages the detent feature 602 of the slide 600 when the toggle switch 500 is placed in the first position. This detent configuration retains or secures the slide 600 in that position.

FIG. 6E shows a perspective view of the trigger cap 400 and the toggle switch 500 in the first position, and FIG. 6F illustrates a cross section of the trigger cap 400 and the toggle switch 500 in the first position. FIGS. 6E and 6F show that while the toggle switch 500 is in the first position, the lock-off feature 606 of the slide 600 engages with the corresponding lock-off feature 610 of the trigger cap 400.

At this position, the slide 600 prevents the trigger cap 400 from rotating. Thus, referring back to FIG. 6D, the protruding member 418 of the trigger cap 400 cannot touch the contact 420 of the switch 422. As a result, the tool 100 cannot be triggered and will be locked in an "off" state.

Figure 6G:
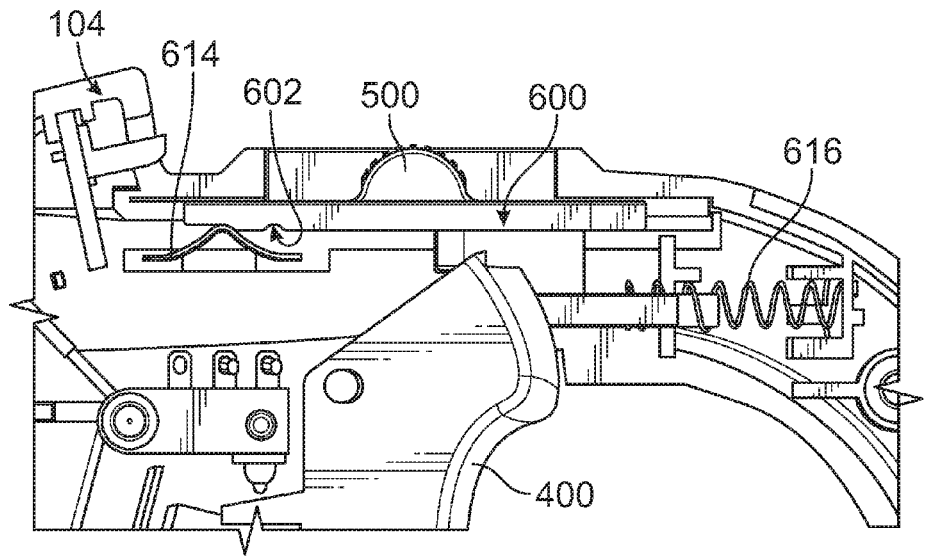
FIG. 6G illustrates a slide and a trigger cap while a toggle switch is in a second position, in accordance with an example embodiment.

FIG. 6G illustrates the slide 600 and the trigger cap 400 while the toggle switch 500 is in the second position. As shown in FIG. 6G when the slide 600 is placed in the second position, the detent member 614 just touches the slide 600, but does not engage the detent feature 602 of the slide 600.

Further, the inclined handle 104 includes a spring 616 that engages with the slide 600 at one end and rests on an internal wall surface of the inclined handle 104 at the other end as shown in FIG. 6G. At this position, the slide 600 floats between the detent member 614 and the spring 616. Thus, the trigger cap 400 can be actuated (i.e., pulled) and released with no interference from the slide 600. As such, the toggle switch 500 and the slide 600 are in a neutral position and the button 226A (and the trigger cap 400) can be freely triggered or released.

Figure 6H:
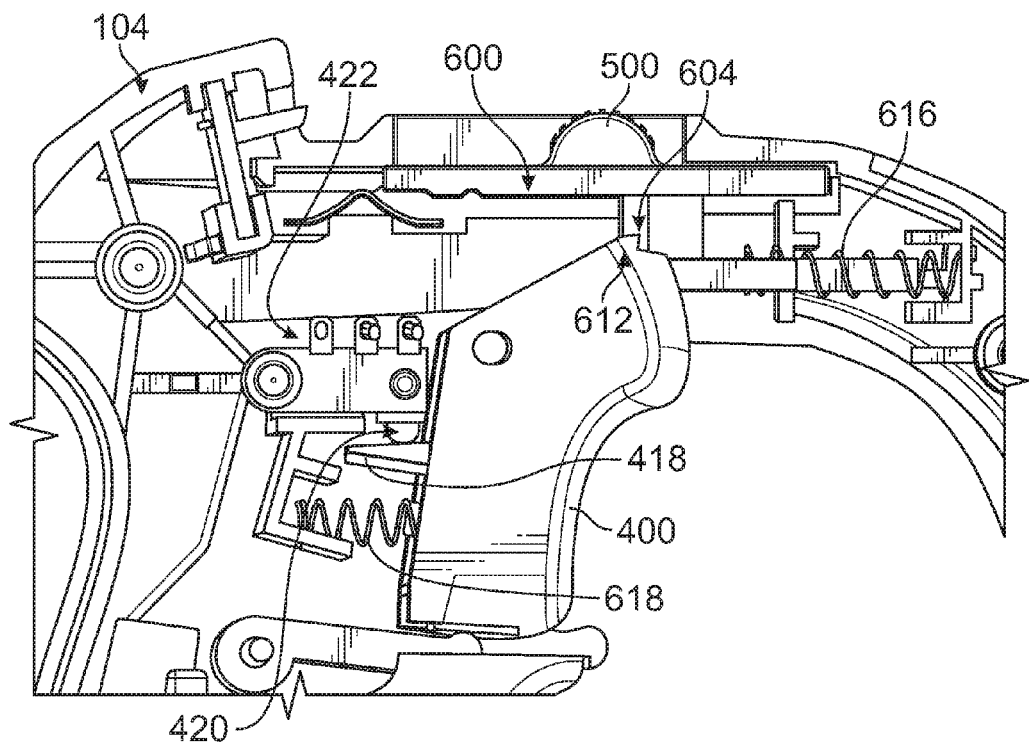
FIG. 6H illustrates a slide and a trigger cap while a toggle switch is in a third position, in accordance with an example embodiment.

FIG. 6H illustrates the slide 600 and the trigger cap 400 while the toggle switch 500 is in the third position. As shown in FIG. 6H, an operator may pull the trigger cap 400 of the button 226A to trigger or activate the tool 100 (i.e., cause the piston 204 to extend the tool 100 to perform a cutting operation). To lock the trigger cap 400 in the "on" state, the operator may move the toggle switch 500 to the third position, thus placing the slide 600 in the position shown in FIG. 6H. At this position, the lock-on feature 604 of the slide 600 engages with the corresponding lock-on feature 612 of the trigger cap 400. Further, the spring 616 acts on the slide 600 to force the slide 600 into the trigger cap 400. At the same time, another spring 618 forces the trigger cap 400 into the slide 600. In this configuration, the trigger cap 400 is locked in this "on" position where the protruding member 418 remains touching the contact 420, and thus the tool 100 remains in a triggered or "on" state. This configuration is useful when an operator seeks to operate the tool 100 remotely as described next.

V. Remote Operation

Figure 7:
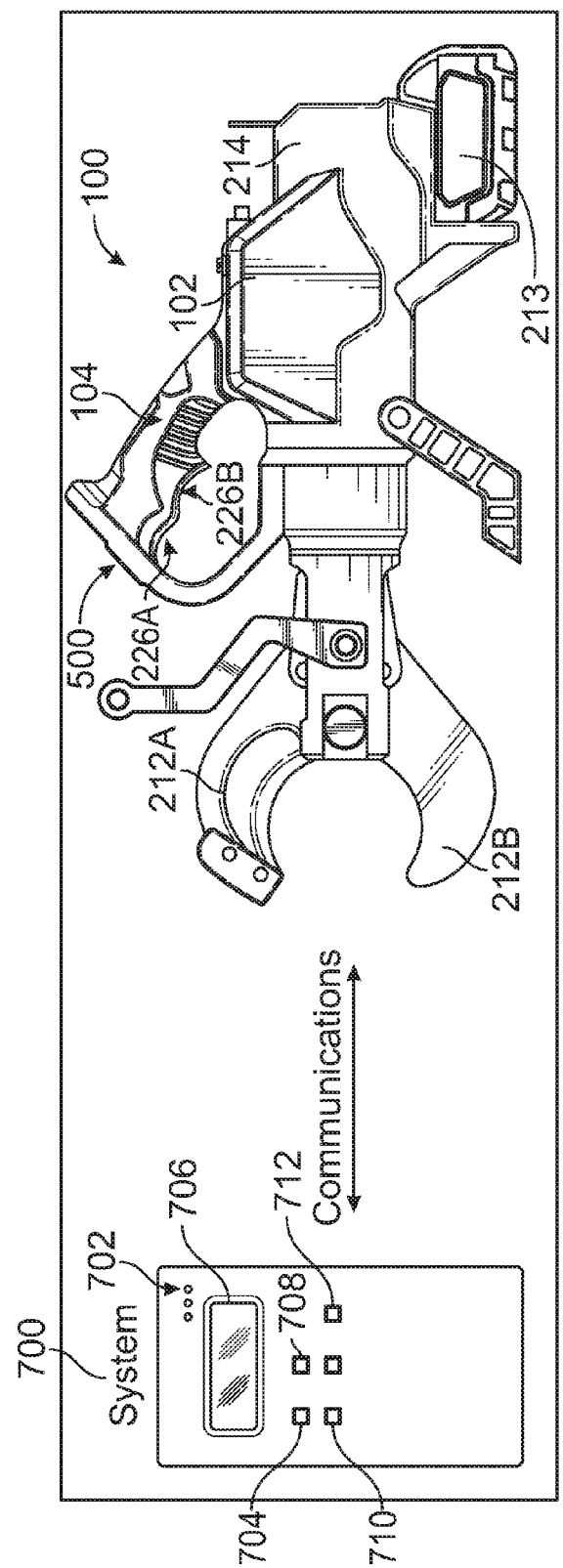
FIG. 7 illustrates a system, in accordance with an example implementation.

FIG. 7 illustrates a system 700, in accordance with an example implementation. The system 700 includes the tool 100, and a device 702 configured to remotely control the tool 100. As mentioned above, the tool 100 may include a controller coupled to or embedded within the tool housing 102. The controller may be configured to operate the tool 100. For example, the controller may be in communication with sensors coupled to the tool 100, and may also be in communication with the buttons 226A and 226B as well as components of the actuation mechanism of the tool 100 (e.g., the battery 213 and the motor 214). For instance, if the button 226A is pulled, the controller may, in response, cause power from the battery 213 to be provided to the motor 214. The controller may further operate the actuation mechanism based on sensor inputs. Example sensor inputs include position sensor information indicating position of the piston 204, pressure sensor information indicating hydraulic pressure, etc.

Additionally, the tool 100 may include one or more antennae that facilitate sending and receiving messages to and from other devices, such as the device 702. The device 702 can be, for example, a mobile phone, personal digital assistant (PDA), laptop, notebook, or netbook computer, tablet computing device, etc. The device 702 may have a user interface to interact with operators/users.

The tool 100 may be configured to operate in at least two operating modes: a normal mode and a remote-cut mode. In the normal mode, an operator may place a cable between the jaws 212A-212B and pull the trigger button 226A causing the piston 204 to move the jaws 212A-212B relative to each other and cut the cable. As long as the operator is pulling the button 226A, the actuation mechanism is powered, e.g., power is provided to the motor 214 that controls motion of the piston 204 via the pump 216. But, as the operator releases the button 226A, power is disconnected from the actuation mechanism. Thus, this normal mode of operation may be safe if the cable is not energized as the operator can stay close to the tool 100, possibly holding the tool 100, while the cutting operation is being performed.

In the remote-cut mode, however, the tool 100 may be remotely controlled via the device 702. The tool 100 may be in wireless communication with the device 702. Thus, the tool 100 and the device 702 may exchange signals and messages associated with performance of a cutting operation. Particularly, the device 702 may be used to remotely control the tool 100 to perform a cutting operation while an operator is away from the tool 100.

A first step associated with the remote-cut mode may involve verifying that a user or operator wants to start a remote-cut operation. For example, an operator may press a button 704 of the device 702 to initiate enabling the remote-cut mode. In response, a processor of the device 702 may generate a display of a message, e.g., "Enable Remote Cut," on a display 706 of the device 702 to alert the operator that the button 704 has been pressed.

To ensure that the button has been pressed intentionally, the device 702 may request a confirmation from the operator. As such, the device 702 may prompt the operator for a second enable criterion in addition to pressing the button 704. For instance, assuming that a button 708 is blue, a display of a message, e.g., "Press 'Blue' to Activate Remote Cut," may be generated on the display 706. The operator may then press the button 708 to confirm that the operator intended to enable the remote-cut mode. Additionally, the device 702 may also determine an amount of time that elapsed between pressing the button 704 and pressing the button 708. If the amount of time is less than a threshold period of time, e.g., 10 seconds, then the device 702 determines that the operator has intended to initiate the remote-cut mode. If the period of time exceeds the threshold period of time, then the device 702 discards the previous pressing of the button 704, and does not initiate enabling the remote-cut mode.

Assuming that the button 708 was pressed within the threshold amount of time, the device 702 verifies the operator's intention to initiate the remote-cut mode. In response, the device 702 may then transmit or send a signal to the tool 100 to command the controller of the tool 100 to prepare for a remote-cut operation.

Further, in an example, the device 702 may request a third enable criterion from the operator. Particularly, a display of a message, e.g., "Confirm Remote Cut Pull Tool Trigger," may be generated on the display 706 to prompt the operator to actuate or pull the trigger button 226A of the tool 100. If the operator pulls the button 226A, the controller of the tool 100 may send a signal/message to the device 702 to confirm that the button 226A has been pulled and that the tool 100 is in the remote-cut mode.

It should be noted that if the tool 100 is in the normal mode of operation, pulling the button 226A may power the tool 100 and cause the jaws 212A-212B to move relative to each other. However, because the tool 100 had received the signal from the device 702 that commands the tool 100 to prepare for the remote-cut mode, pulling the button 226A does not power the tool 100 and the motor 214 will not be actuated.

In addition to sending the signal to the device 702, the tool 100 may provide an indication to the operator that the tool 100 is now in the remote-cut mode (e.g., the tool 100 switched from a normal mode of operation to the remote-cut mode of operation). For instance, the tool 100 may have a light emitting diode (LED) indicator (not shown). The controller of the tool 100 may cause the LED indicator to flash or emit light intermittently at a particular frequency (e.g., 2 flashes per second) to notify the operator that the remote-cut mode is enabled.

In an example, the controller may further start a timer upon sending the signal to the device 702. If a threshold period of time (e.g., 2 minutes) lapses from the start of the timer without receiving further communications from the device 702, the controller may cause the tool 100 to disable or exit the remote-cut mode and switch back to the normal mode of operation.

Upon receiving the signal at the device 702, a display of a message, e.g., "Remote Cut Enabled", may be generated on the display 706 to further confirm to the operator that the remote-cut mode is enabled. Now that the remote-cut mode is enabled, the operator may next prepare the cut location at the tool 100. For instance, the operator may place a cable between the jaws 212A-212B. Flashing of the LED indicator indicates to the operator that the tool 100 is still in the remote-cut mode.

A second step associated with the remote-cut mode may involve arming or readying the tool 100 before the operator exits the cut location to avoid any hazards. For example, as discussed herein, the tool 100 may further include the toggle switch 500. If the button 226A is pulled, and then the toggle switch 500 is placed in the third position discussed with respect to FIGS. 5C and 6H, the button 226A will be locked in an "on" state and the tool 100 is armed. The "on" state of the button 226A could also be referred to as an "active" or "enabled" state. This process may require both hands of the operator: one hand to pull the button 226A, and a second hand to actuate the toggle switch 500. This two handed requirement is a safety precaution as the operator cannot lock the button 226A in the "on" state accidently by using only one hand.

In an example, the controller of the tool 100 may start a timer when the button 226A is locked in the "on" state by the toggle switch 500. If the button 226A remains depressed for a threshold period of time (e.g., 20 seconds), the controller confirms that the operator intends to arm the tool 100. The operator can disarm the tool 100 with one hand by placing the toggle switch 500 in either the first or second position described herein with respect to FIGS. 5A and 5B.

When the controller confirms that the operator intends the tool 100 to be armed, the controller sends a signal to the device 702 to inform the device 702 that the button 226A is locked in the "on" state and the tool 100 is armed. In response, a display of a message, e.g., "Tool Armed! Press Start to Begin Cut," may be generated on the display 706.

A third step associated with the remote-cut mode may involve starting the cutting operation. Now that the tool 100 is armed and ready to perform the cutting operation, the operator exits or has already exited the cutting location to avoid certain hazards. The operator can control the cutting tool remotely via the device 702.

In an example, to confirm that the operator intends to command the tool 100 to cut a cable placed between the jaws 212A and 212B, the operator may be required to press and hold one or more buttons of the device 702 for a particular period of time (e.g., 3 seconds). For instance, the operator may press on buttons 710 and 712 shown in FIG. 7 to start the cutting operation remotely. The buttons 710 and 712 may be placed on the user interface of the device 702 at respective locations that ensure using both hands of the operator to command starting the cutting operation. Using both hands further confirms the operator's intention to perform a remote cut. The buttons 710 and 712 may be pressed at substantially the same time (e.g., the operator may begin pressing the button 710 and then within a threshold period of time, such as 100 milli-seconds, begins pressing the other button 712). Requiring the operator to use both hands to send the cutting command further ensures that the operator's hands are away from the tool 100 and therefore enhances operator safety.

If the device 702 confirms that the operator intends to start the cutting operation by pressing both buttons 710 and 712 substantially simultaneously for a particular period of time, the device 702 sends a signal to the tool 100. In response to receiving the signal, the controller of the tool 100 may provide a command to the motor 214 to operate the pump 216 and start the cutting operation. A display of a message, e.g., "Remote Cut Starting—Cutting" may be generated on the display 706 of the device 702 to show the operator that the cutting operation started or is about to start.

Additionally, the tool 100 and the device 702 may provide the operator with a status of a cutting operation. In an example, the controller of the tool 100 may receive information indicating that a cutting operation has been performed successfully. For instance, a hydraulic pressure within the tool 100 may reach a threshold or target pressure value indicating that the piston 204 reached a limit of its travel stroke and thus the cut was successfully performed. As another example, the piston 204 may have a position sensor that might indicate to the controller that the piston 204 reached the end of its travel stroke. Other indicators are also possible.

On the other hand, the controller may also determine that a failure occurred during the cutting operation. For instance, the controller may determine or receive sensor information indicating that the piston 204 has stalled or that the battery 213 is overloaded, or other events that might indicate fault with the tool 100.

Whether the cutting operation is successful or an error has occurred, the controller of the tool 100 may send a signal to the device 702 to indicate the status of the cutting operation. When the device 702 receives the signal, the device 702 may provide indications to the operator regarding the status of the cutting operation. For instance, if the cutting operation has been successful, a display of a message "Cut Complete!" may be generated on the display 706. On the other hand, if a fault has occurred and the cutting operation has been stopped, a display of a message "System Fault!" may be generated on the display 706.

Upon completion of the cutting operation, the controller of the tool 100 may cause the tool 100 to switch back to the normal mode of operation. As mentioned herein, in the normal mode of operation, if the operator pulls the trigger button 226A, the motor 214 of the tool 100 would be powered and the piston 204 would start to extend.

To enhance safety of the system described above, it is desirable to ensure exclusive one-to-one pairing between the device 702 and the tool 100. In other words, the tool 100 may be configured to respond only to signals received from the device 702, and thus not respond to signals from any other devices. Similarly, the device 702 may be configured to communicate exclusively with the tool 100. In this manner, unintended signals from other devices would not interfere with operation of the tool 100 and the device 702.

As an example, to ensure exclusive one-to-one pairing between the tool 100 and the device 702, the tool 100 may be assigned a particular communication address. Further, the device 702 may have a memory configured to store the particular communication address of the tool 100. The device 702 may be configured to receive signals and communications in general only from a tool having a particular communication address, i.e., the tool 100. An example communication address may include a media access control (MAC) address. Further, the tool 100 may also have the same MAC address stored in its memory, and would pair only with the device 702, which is assigned the same MAC address.

VI. Conclusion

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A tool comprising:
   a housing;
   an inclined handle coupled to, and extending obliquely from, a top portion of the housing, wherein the inclined handle has a first trigger button and a second trigger button; and
   an interlocking mechanism disposed in the inclined handle, wherein the interlocking mechanism comprises a toggle lever configured to prevent one of the first trigger button or the second trigger button from being triggered while the other of the first trigger button or the second trigger button is triggered.

2. The tool of claim 1, further comprising:
   a toggle switch configured to assume one of at least three positions, wherein:
   when positioned at a first position, the toggle switch locks one of the first trigger button or the second trigger button in a released state,
   when positioned at a second position, the toggle switch is in a neutral state, and
   when positioned at a third position, the toggle switch locks one of the first trigger button or the second trigger button in a triggered state.

3. The tool of claim 2, wherein positioning the toggle switch at the second position enables the first trigger button or the second trigger button to be triggered or released.

4. The tool of claim 2, wherein the inclined handle includes a cutout section on a top surface of the inclined handle, wherein the toggle switch protrudes through the cutout section and is configured to slide within the cutout section between the three positions.

5. The tool of claim 2, further comprising:
an actuator coupled to the housing;
one or more jaws coupled to the actuator; and
a controller coupled to the housing, wherein the controller is in wireless communication with a remote device, and wherein the controller is configured to perform operations comprising:
receiving a first signal from the remote device indicating a request to operate the tool remotely,
receiving information indicating that the first trigger button has been locked in the triggered state by way of the toggle switch being in the third position,
sending a second signal to the remote device indicating that the first trigger button has been locked in the triggered state, and
in response to receiving a third signal from the remote device, causing the actuator to move the one or more jaws to operate the tool remotely.

6. The tool of claim 5, wherein the controller is configured to operate the tool in a normal mode or a remote-cut mode, wherein:
in the normal mode, the controller operates the actuator to cause the one or more jaws to move in response to the first trigger button being in the triggered state, and
in the remote-cut mode, the controller operates the actuator to cause the one or more jaws to move in response to (i) receiving the third signal from the remote device, and (ii) the toggle switch being in the third position.

7. The tool of claim 6, wherein the operations further comprise:
switching the tool from operating in the normal mode to the remote-cut mode in response to receiving at least the first signal.

8. The tool of claim 6, wherein the operations further comprise:
determining that remote operation of the tool has been successful; and
responsively, switching the tool from operating in the remote-cut mode into the normal mode.

9. The tool of claim 1, wherein the inclined handle defines a handle axis, which intersects with a horizontal axis and a vertical axis of the housing at respective inclined angles.

10. The tool of claim 1, further comprising:
wherein at least a portion of an exterior profile of the inclined handle comprises a first depression and a second depression spatially arranged in series along the portion of the exterior profile, and wherein the first trigger button is disposed in the first depression and the second trigger button is disposed in the second depression.

11. The tool of claim 1, further comprising:
a stand rotatably coupled to a bottom of the housing, wherein the stand is rotatable between at least two positions, wherein in a first position, the stand enables the tool to be positioned on a work surface while maintaining a desired orientation, and in a second position, the stand is folded underneath the housing.

12. The tool of claim 1, further comprising:
a hydraulic actuator cylinder coupled to the housing;
a piston slidably accommodated within the hydraulic actuator cylinder; and
a ram coupled to the piston and configured to drive one or more jaws, wherein the first trigger button is configured to cause the piston to extend and the one or more jaws to move toward each other, and the second trigger button is configured to cause the piston to retract and the one or more jaws to move away from each other.

13. The tool of claim 12, further comprising:
a clevis having a first end coupled to the hydraulic actuator cylinder and a second end coupled to the one or more jaws; and
a basket-style handle coupled to the clevis and extending upward.

14. The tool of claim 13, wherein the basket-style handle is pivotably mounted to the clevis such that an angle between the basket-style handle and the clevis is adjustable.

15. The tool of claim 1, wherein the toggle lever comprises a proximal end and a distal end, the proximal end being pivotably mounted inside the inclined handle, and the distal end being disposed between the first trigger button and the second trigger button.

16. The tool of claim 15, wherein the first trigger button includes a groove at a bottom end of the first trigger button, and the second trigger button includes a respective groove at a top end of the second trigger button, such that:
when the first trigger button is pulled, the toggle lever rotates downward and the distal end of the toggle lever engages the respective groove of the second trigger button thereby preventing the second trigger button from being triggered, and
when the second trigger button is pulled, the toggle lever is pushed upward and the distal end of the toggle lever engages the groove of the first trigger button thereby preventing the first trigger button from being triggered.

* * * * *